US010945202B2

(12) United States Patent
Xing

(10) Patent No.: US 10,945,202 B2
(45) Date of Patent: Mar. 9, 2021

(54) METHOD FOR SELECTING WIRELESS ACCESS POINT, FTM SESSION METHOD, TERMINAL, AND SERVER

(71) Applicant: Huawei Technologies Co., Ltd., Shenzhen (CN)

(72) Inventor: Zhihao Xing, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/388,186

(22) Filed: Apr. 18, 2019

(65) Prior Publication Data

US 2019/0246349 A1 Aug. 8, 2019

Related U.S. Application Data

(63) Continuation of application No. PCT/CN2017/095613, filed on Aug. 2, 2017.

(30) Foreign Application Priority Data

Oct. 31, 2016 (CN) .......................... 201610928778.8

(51) Int. Cl.
*H04W 48/20* (2009.01)
*H04W 64/00* (2009.01)
*H04W 48/16* (2009.01)

(52) U.S. Cl.
CPC ........... *H04W 48/20* (2013.01); *H04W 48/16* (2013.01); *H04W 64/00* (2013.01)

(58) Field of Classification Search
None
See application file for complete search history.

(56) References Cited

U.S. PATENT DOCUMENTS

| 2015/0049716 | A1 | 2/2015 | Gutierrez et al. |
| 2015/0063228 | A1 | 3/2015 | Aldana |
| 2015/0257120 | A1 | 9/2015 | Prechner et al. |
| 2015/0341892 | A1 | 11/2015 | Aldana |
| 2015/0365805 | A1* | 12/2015 | Bajko ................... G01S 13/878 455/456.1 |

(Continued)

FOREIGN PATENT DOCUMENTS

| CN | 101938789 A | 1/2011 |
| CN | 104469888 A | 3/2015 |

(Continued)

OTHER PUBLICATIONS

Machine Translation and Abstract of Chinese Publication No. CN101938789, Jan. 5, 2011, 15 pages.

(Continued)

*Primary Examiner* — Anh Vu H Ly
(74) *Attorney, Agent, or Firm* — Conley Rose, P.C.

(57) ABSTRACT

A method for selecting a wireless access point (AP) relates to the field of communications technologies, and to a fine time measurement (FTM) technology in a wireless network, where after receiving a query request carrying a query condition, a server determines a target AP according to stored service capability information of each of multiple APs that support an FTM mechanism and the query condition, and sends a media access control (MAC) address of the target AP and information about a frequency band and a channel used by the target AP to a terminal.

28 Claims, 4 Drawing Sheets

(56) References Cited

U.S. PATENT DOCUMENTS

| | | | |
|---|---|---|---|
| 2015/0365913 | A1 | 12/2015 | Aldana |
| 2016/0183171 | A1 | 6/2016 | Hareuveni et al. |
| 2017/0013412 | A1* | 1/2017 | Steiner .................... H04W 4/38 |
| 2017/0171833 | A1* | 6/2017 | Vamaraju ............... H04W 60/04 |
| 2017/0187830 | A1* | 6/2017 | Eyal .................... H04L 65/4076 |
| 2017/0188300 | A1* | 6/2017 | Eyal ...................... H04W 4/025 |
| 2017/0257758 | A1* | 9/2017 | Aldana ................. H04W 24/10 |
| 2018/0027561 | A1* | 1/2018 | Segev ................... H04L 5/0091 370/329 |
| 2018/0115424 | A1* | 4/2018 | Bhandaru ............. H04L 9/0861 |
| 2019/0191323 | A1* | 6/2019 | Venkatesan ........... H04L 5/0055 |
| 2019/0297595 | A1* | 9/2019 | Sirotkin ............... G01C 21/206 |
| 2020/0081091 | A1* | 3/2020 | Amin .................... H04W 64/00 |

FOREIGN PATENT DOCUMENTS

| | | |
|---|---|---|
| CN | 105493570 A | 4/2016 |
| CN | 105981456 A | 9/2016 |

OTHER PUBLICATIONS

Machine Translation and Abstract of Chinese Publication No. CN104469888, Mar. 25, 2015, 16 pages.

"Part 11: Wireless LAN Medium Access Control(MAC) and Physical Layer(PHY) Specifications," IEEE 802.11-2012, IEEE Computer Society, Part 1, Mar. 29, 2012, 1396 pages.

"Part 11: Wireless LAN Medium Access Control(MAC) and Physical Layer(PHY) Specifications," IEEE 802.11-2012, IEEE Computer Society, Part 2, Mar. 29, 2012, 1397 pages.

Foreign Communication From A Counterpart Application, Chinese Application No. 201610928778.8, Chinese Office Action dated May 7, 2019, 6 pages.

Foreign Communication From A Counterpart Application, PCT Application No. PCT/CN2017/095613, English Translation of International Search Report dated Oct. 9, 2017, 2 pages.

Foreign Communication From A Counterpart Application, PCT Application No. PCT/CN2017/095613, English Translation of Written Opinion dated Oct. 9, 2017, 5 pages.

"IEEE P802.11-REVmc/D7.0, Draft Standard for Information technology—Telecommunications and information exchange between systems—Local and metropolitan area networks—Specific requirements, Part 11: Wireless LAN Medium Access Control (MAC) and Physical Layer (PHY) Specifications," Aug. 2016, 118 pages.

Foreign Communication From A Counterpart Application, European Application No. 17864699.8, Extended European Search Report dated Sep. 30, 2019, 9 pages.

\* cited by examiner

METHOD FOR SELECTING WIRELESS ACCESS POINT, FTM SESSION METHOD, TERMINAL, AND SERVER

CROSS-REFERENCE TO RELATED APPLICATIONS

This application is a continuation of International Patent Application No. PCT/CN2017/095613 filed on Aug. 2, 2017, which claims priority to Chinese Patent Application No. 201610928778.8 filed on Oct. 31, 2016. The disclosures of the aforementioned applications are hereby incorporated by reference in their entireties.

TECHNICAL FIELD

This application relates to the field of communications technologies, and in particular, to a fine time measurement technology in a wireless network.

BACKGROUND

Ranging or positioning technologies based on a signal time of flight (TOF) have been widely used. For example, indoor positioning may be performed based on the signal TOF in an indoor environment such as a shopping mall, an underground parking garage, or an intelligent plant. To satisfy a requirement of ranging or positioning based on the TOF, a fine time measurement (also referred to as FTM) mechanism is defined in the 802.11 standards. According to the FTM mechanism, a period of time for transmitting a signal from a transmit end to a receive end through an air interface can be finely measured in order to calculate a distance between the transmit end and the receive end.

Two roles are defined in the FTM mechanism in the 802.11 standards, an FTM requester and an FTM responder. The FTM requester may be a terminal. In an FTM interaction process, an FTM requester needs to scan, in specific frequency band and channel ranges, a beacon frame sent by a wireless access point (also referred to as AP), and identify, according to the beacon frame, whether the wireless access point obtained by scanning supports the FTM mechanism. When the wireless access point supports the FTM mechanism, the FTM requester needs to perform FTM session negotiation with the wireless access point to negotiate an FTM interaction parameter. If the FTM requester and the wireless access point reach a consensus on the FTM interaction parameter by means of negotiation, the wireless access point may be used as an FTM responder, and a signal TOF may be measured between the FTM requester and the FTM responder based on the FTM mechanism.

However, not all wireless access points support the FTM mechanism. Therefore, an FTM requester can find, only by means of multiple times of scanning, a wireless access point that supports the FTM mechanism. As a result, a process of finding the wireless access point that supports the FTM mechanism is relatively time-consuming. Consequently, the FTM requester takes a relatively long time to detect an FTM responder, affecting efficiency of ranging or positioning based on the FTM mechanism.

SUMMARY

This application provides a method for selecting a wireless access point, an FTM session method, a terminal, and a server. In this way, an FTM interaction requester can more quickly detect an FTM responder, thereby improving efficiency of ranging or positioning based on an FTM mechanism.

A first aspect of this application provides a method for selecting a wireless access point. In the method, a server receives a query request sent by a terminal, where the query request carries a query condition, and after determining, in multiple wireless access points (APs) that support a fine time measurement FTM mechanism, a target AP according to stored service capability information of each of the multiple APs that support the FTM mechanism and the query condition, sends, to the terminal, a stored media access control (MAC) address of the target AP and stored information of a frequency band and a channel that are used by the target AP. Because the target AP is an AP that supports the FTM mechanism, the terminal directly scans for, according to the MAC address of the target AP, the target AP in the frequency band and on the channel used by the target AP, and may directly perform FTM session negotiation with the target AP. This avoids consumption of a time and bandwidth caused by positioning, by means of multiple times of scanning, the AP that supports the FTM mechanism, thereby improving efficiency of the FTM session negotiation, and improving FTM interaction efficiency.

In a possible design, the query condition carried in the query request that is sent by the terminal may include an estimated position of the terminal and a scanning range set by the terminal such that the server excludes an AP that is not located in the scanning range of the terminal. The service capability information of each of the multiple APs that is stored in the server may include position information of each of the multiple APs. Correspondingly, the determined target AP may be located in a range determined according to the estimated position of the terminal and the scanning range set by the terminal. In this way, the terminal can obtain the target AP in the scanning range of the terminal by scanning.

In a possible design, the service capability information stored in the server may further include a value of an FTM parameter supported by each of the multiple APs. Correspondingly, the query condition carried in the query request that is received by the server may include a value of an FTM parameter expected by the terminal during the FTM session negotiation. In this way, the target AP determined by the server satisfies, an intersection set of a value of an FTM parameter supported by the target AP and the value of the FTM parameter expected by the terminal is a non-empty set. It can be learned that the FTM parameter supported by the target AP determined by the server can meet the value of the FTM parameter expected by the terminal during the FTM session negotiation. In this way, this helps improve a success rate of session negotiation performed between the terminal and the target AP, thereby helping the terminal quickly determine an AP that is used as an FTM responder, and reducing a time and bandwidth that are consumed during the FTM session negotiation.

In a possible design, the FTM parameter includes at least one of an FTM format and bandwidth, a number of burst exponent, burst duration, FTMs per burst, minimum delta FTM (Min Delta FTM), or a burst period.

In a possible design, the service capability information of each of the multiple APs may include a value of a constraint parameter set by each of the multiple APs, where the constraint parameter includes one or more of maximum session duration (Max Session Duration) used to constrain a value of a burst period and a value of a number of burst exponent that are supported by each of the multiple APs, where Max Session Duration=T(Burst Period supported by the AP)*$2^{Number\ of\ Burst\ Exponent\ supported\ by\ the\ AP}$, a used to constrain the value of the burst period and a value of burst duration that are supported by each of the multiple APs, where Max Duty Cycle=T(Burst Duration supported by the AP)/T (Burst Period supported by the AP), or a maximum FTM frequency Max FTM Frequency used to constrain a value of FTMs per burst and the value of the burst duration that are supported by each of the multiple APs, where Max FTM Frequency=FTMs per Burst supported by the AP/T (Burst Duration supported by the AP). Correspondingly, a constraint parameter set by the target AP determined by the server and the FTM parameter expected by the terminal meet at least one or more of the foregoing constraint conditions, where when the query condition includes a value of a number of burst exponent expected by the terminal and a value of a burst period expected by the terminal, the values of the number of burst exponent and the burst period that are expected by the terminal and a value of max session duration set by the target AP meet a first constraint condition T(Burst Period expected by the terminal)*$2^{Number\ of\ Burst\ Exponent\ expected\ by\ the\ terminal}$<Max Session Duration, when the query condition includes burst duration expected by the terminal and the burst period expected by the terminal, the values of the burst duration and the burst period that are expected by the terminal and a value of a max duty cycle set by the target AP meet a second constraint condition T(Burst Duration expected by the terminal)/T (Burst Period expected by the terminal)<Max Duty Cycle, or when the query condition includes FTMs per burst expected by the terminal and the burst duration expected by the terminal, the values of the FTMs per burst and the burst duration that are expected by the terminal and a value of max session duration set by the target AP meet a third constraint condition FTMs per Burst expected by the terminal/T(Burst Duration expected by the terminal)<Max FTM Frequency, where T(Burst Period supported by the AP) indicates a real time length corresponding to the value of the burst period supported by each of the multiple APs, T(Burst Period supported by the AP) indicates a real time length corresponding to the value of the burst duration supported by each of the multiple APs, T(Burst Duration expected by the terminal) indicates a real time length corresponding to the value of the burst duration expected by the terminal, and T(Burst Period expected by the terminal) indicates a real time length corresponding to the value of the burst period expected by the terminal.

The service capability information of the multiple APs includes the values of the constraint parameters set by the multiple APs. In this way, the multiple APs can define, by setting values of preset parameters, a constraint relationship between values of different FTM parameters supported by the multiple APs such that the values of the FTM parameters can be kept within the capabilities of the APs. Correspondingly, it can be further ensured that the target AP can meet expectations of the terminal for the FTM parameters during the FTM session negotiation by defining a constraint relationship between values of different FTM parameters expected by the terminal and the constraint parameter set by the target AP.

In a possible design, the service capability information of each of the multiple APs that is stored in the server may further include communication load of each of the multiple APs. When there are at least two target APs, the server may further prioritize the at least two target APs according to one or more of the following preset prioritization rules to obtain a priority order of the least two target APs a priority of an AP that is in the at least two target APs and whose position is closer to the estimated position of the terminal is higher, a priority of an AP that is in the at least two target APs and whose FTM format and bandwidth has a larger value is higher, a priority of an AP that is in the at least two target APs and whose constraint parameter has a larger value is higher, or a priority of an AP that is in the at least two target APs and whose communication load is lower is higher.

Correspondingly, the server may further send the priority order of the at least two target APs to the terminal. The preset prioritization rule is based on quality of FTM interaction provided by the target APs. That is, higher quality of FTM interaction between a target AP and the terminal indicates a higher priority of the AP. Therefore, the terminal can select, according to the priority order of the target APs, a target AP with which FTM session negotiation needs to be performed in order to improve quality of FTM interaction.

In another possible implementation, the server may further sort the target APs according to the priority order, for example, a target AP having a higher priority is top ranked in a list, and send the sorted target APs to the terminal. In this way, the terminal can select, according to an order of the target APs in the list, a target AP top ranked to perform FTM session negotiation.

A second aspect of this application provides a server, including a communications interface, a memory, and a processor. The communications interface is configured to receive a query request sent by a terminal, where the query request carries a query condition. The memory is configured to store service capability information of each of multiple wireless access points that support a FTM mechanism, MAC addresses of the multiple APs, and information about frequency bands and channels that are used by the multiple APs, where the service capability information of each of the multiple APs includes position information of each of the multiple APs. The processor is configured to determine a target AP in the multiple APs according to the stored service capability information of each of the multiple APs and the query condition. The communications interface is further configured to send, to the terminal, a stored MAC address of the target AP and stored information of a frequency band and a channel that are used by the target AP such that the terminal scans for, according to the MAC address of the target AP, the target AP in the frequency band and on the channel used by the target AP, and performs FTM session negotiation with the target AP.

In a possible implementation, the query condition carried in the query request that is received by the communications interface includes an estimated position of the terminal and a scanning range set by the terminal, the service capability information of each of the multiple APs that is stored in the memory includes position information of each of the multiple APs, and when determining, in the multiple wireless access points that support the fine time measurement FTM mechanism, the target AP according to the stored service capability information of each of the multiple APs, the processor is configured to determine the target AP in the multiple APs according to the position information of each of the multiple APs, the estimated position of the terminal, and the scanning range set by the terminal, where a position of the target AP is in a range determined according to the estimated position of the terminal and the scanning range set by the terminal.

In a possible implementation, the query condition carried in the query request that is received by the communications interface includes a value of an FTM parameter expected by the terminal during the FTM session negotiation, the service capability information of each of the multiple APs that is stored in the memory includes a value of an FTM parameter supported by each of the multiple APs, and when determining, in the multiple wireless access points (APs) that support the fine time measurement FTM mechanism, the target AP according to the stored service capability information of each of the multiple APs, the processor is configured to determine the target AP in the multiple APs according to the value of the FTM parameter supported by each of the multiple APs and the value of the FTM parameter expected by the terminal, where an intersection set of a value of an FTM parameter supported by the target AP and the expected value of the FTM parameter is a non-empty set.

The second aspect and the first aspect of the embodiments of the present disclosure are consistent in design ideas, and similar in technical means. For specific beneficial effects brought by the technical solution, refer to the first aspect. Details are not further provided.

A third aspect of this application provides an FTM session method. In the method, a terminal sends a query request to a server, where the query request carries a query condition, and obtains a MAC address of a target AP and information about a frequency band and a channel that are used by the target AP, where the MAC address and the information are returned by the server after responding to the query request. The target AP is an AP that supports an FTM mechanism, and the target AP meets the query condition. Therefore, the terminal can directly scan for, according to the MAC address of the target AP, the target AP in the frequency band and on the channel used by the target AP, and directly perform FTM session negotiation with the target AP when the target AP is obtained by scanning. This avoids consumption of a time and bandwidth caused by positioning, by means of multiple times of scanning, the AP that supports the FTM mechanism, thereby improving efficiency of the FTM session negotiation, and improving FTM interaction efficiency.

In a possible design, the query condition may include an estimated position of the terminal and a scanning range set by the terminal. Correspondingly, a position of the target AP is in a range determined according to the estimated position of the terminal and the scanning range set by the terminal. Therefore, the terminal can obtain the target AP in the scanning range of the terminal by scanning.

In a possible design, the query condition carried in the query request that is sent by the terminal may include a value of an FTM parameter expected by the terminal during the FTM session negotiation, and an intersection set of a value of an FTM parameter supported by the target AP determined by the server and the value of the FTM parameter expected by the terminal is a non-empty set. This helps improve a success rate of session negotiation between the terminal and the target AP.

In a possible design, the terminal may further obtain a priority order of the target APs that is returned by the server. In this way, the terminal may select, according to the priority order, an AP with which FTM session negotiation needs to be performed to perform FTM session negotiation in order to improve quality of FTM interaction.

In a possible design, the terminal may further obtain service capability information of the target AP that is returned by the server. The service capability information of the target AP includes at least one of position information of the target AP, the value of the FTM parameter supported by the target AP, current communication load of the target AP, maximum session duration (Max Session Duration) of the target AP, a maximum duty cycle (Max Duty Cycle) of the target AP, or a maximum FTM frequency (Max FTM Frequency) of the target AP. In this way, the terminal can directly determine again, based on the service capability information of the target AP when the query condition of the terminal changes, an AP with which FTM session negotiation needs to be performed, thereby reducing a consumed time required for determining an AP that is for performing FTM session negotiation.

A fourth aspect of this application provides a terminal, including a communications interface and a processor. The communications interface is configured to send a query request to a server, where the query request carries a query condition, obtain a MAC address of a target wireless access point and information about a frequency band and a channel that are used by the target AP, where the MAC address and the information are returned by the server, the target AP is an AP that supports a fine time measurement FTM mechanism, and the target AP meets the query condition. The processor is configured to scan for, according to the MAC address of the target AP, the target AP in the frequency band and on the channel that are used by the target AP, and perform FTM session negotiation with the target AP when the target AP is obtained by scanning.

In a possible design, the query condition carried in the query request that is sent by the communications interface includes an estimated position of the terminal and a scanning range set by the terminal, and a position of the target AP is in a range determined according to the estimated position of the terminal and the scanning range set by the terminal.

In a possible design, the query condition carried in the query request that is sent by the communications interface includes a value of an FTM parameter expected by the terminal during the FTM session negotiation, and an intersection set of a value of an FTM parameter supported by the target AP and the value of the FTM parameter expected by the terminal is a non-empty set.

In a possible design, the communications interface is further configured to obtain a priority order of at least two target APs that is returned by the server, and when performing FTM session negotiation with the target AP, the processor is configured to select, from the at least two target APs according to the priority order, an AP with which FTM session negotiation needs to be performed, to perform FTM session negotiation.

The fourth aspect and the third aspect of the embodiments of the present disclosure are consistent in design ideas, and similar in technical means. For specific beneficial effects brought by the technical solution, refer to the third aspect. Details are not further provided.

BRIEF DESCRIPTION OF DRAWINGS

To describe the technical solutions in some of the embodiments of this application more clearly, the following briefly describes the accompanying drawings describing some of the embodiments.

DESCRIPTION OF EMBODIMENTS

Solutions of the embodiments of this application are applicable to a scenario in which ranging or positioning is performed based on an FTM mechanism defined in the 802.11 standards.

Figure 1:
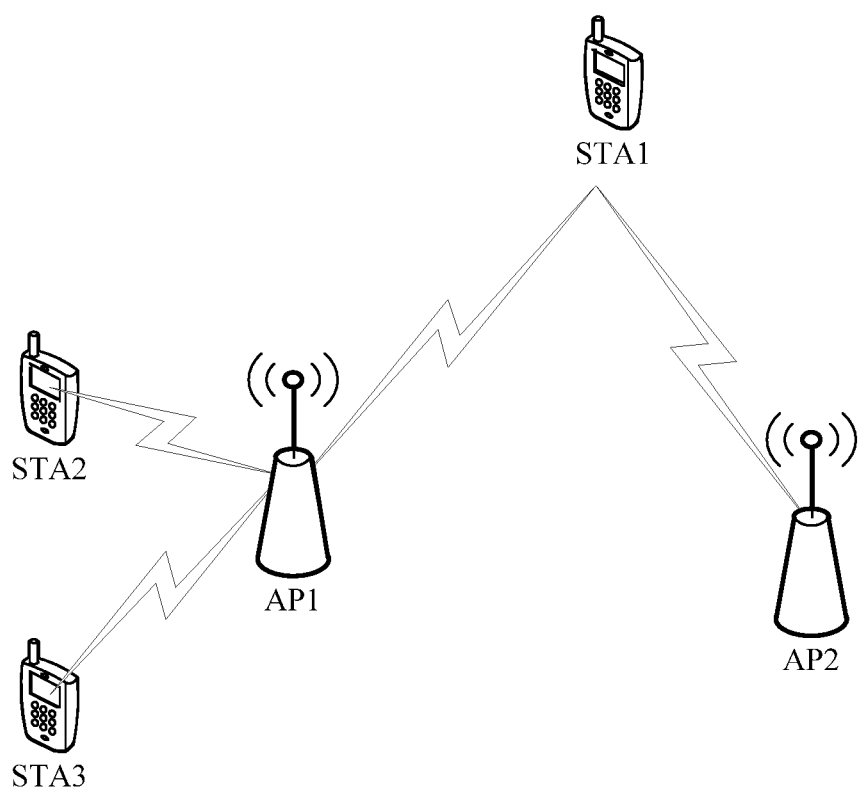
FIG. 1 is a schematic diagram of a network architecture of performing session negotiation based on an FTM mechanism.

For example, FIG. 1 is a schematic diagram of a network architecture of performing session negotiation based on an FTM mechanism. The FTM mechanism includes an FTM requester and an FTM responder. The FTM requester may be a station (also referred to as STA) that supports the FTM mechanism. The station may also be referred to as a terminal. For example, the FTM requester may be a mobile phone, a tablet computer, or another terminal that supports the FTM mechanism. The FTM responder is a wireless access point that supports the FTM mechanism.

Regardless of whether an AP supports the FTM mechanism, the AP periodically broadcasts a beacon frame such that a device serving as a station can obtain the AP by scanning and join a wireless network created by the AP. Generally, there may be multiple APs around one station, and similarly, there may be multiple stations around one AP. For example, referring to FIG. 1, the network architecture in FIG. 1 includes three stations, STA1, STA2, and STA 3 respectively. In addition, the network architecture includes two APs, AP1 and AP2 respectively. Stations around AP1 may be STA1, STA2, and STA3, and STA1, STA2, and STA3 can obtain, by scanning, a beacon frame broadcast by the AP1. Stations around AP2 may be STA1. In this case, STA1 can further obtain, by scanning, a beacon frame broadcast by AP2. Certainly, FIG. 1 is only a schematic diagram. In an embodiment, there may be a large quantity of APs around each station, and there may be a large quantity of stations around each AP.

A station that supports the FTM mechanism needs to scan APs around the station and select an AP that supports the FTM mechanism from APs obtained by scanning, and can subsequently perform session negotiation with the AP that supports the FTM mechanism in order to perform positioning or ranging based on the FTM mechanism when a consensus is reached on an FTM interaction parameter. For example, it is assumed that STA1 is a station that supports the FTM mechanism, and STA1 expects to perform an operation such as positioning or ranging based on the FTM mechanism. STA1 may be used as an FTM requester to scan APs around STA1 for APs that are among the APs and that support the FTM mechanism. Therefore, STA1 performs FTM session negotiation with the APs that support the FTM mechanism and that are obtained by scanning, determines, in the APs that support the FTM mechanism, at least one AP as an FTM responder, and implements positioning or ranging by means of interaction between STA1 and the at least one FTM responder.

Because among APs around a station, only some APs may support the FTM mechanism, the FTM requester may need to perform scanning for multiple times to find an AP that supports the FTM mechanism. As a result, scanning is performed for many times and consumes a long time. In addition, after the FTM requester finds the AP that supports the FTM mechanism, the AP that supports the FTM mechanism can become an FTM responder only after the FTM requester and the AP that supports the FTM mechanism reach a consensus on an FTM interaction parameter by means of negotiation. Therefore, if a process of finding the AP that supports the FTM mechanism by the FTM requester is relatively time-consuming, the FTM measurement requester unavoidably takes a relatively long time to detect the FTM responder, reducing FTM measurement efficiency.

Further, because the FTM requester further needs to perform, after the AP that supports the FTM mechanism is found, FTM session negotiation with the AP that supports the FTM mechanism, if a consensus cannot be reached on the FTM interaction parameter, the terminal still needs to scan again for another AP that supports the FTM mechanism and perform negotiation again. As a result, a negotiation success rate is low, and large amounts of time and bandwidth are wasted.

To resolve the foregoing problems, the embodiments of this application provide a method for selecting a wireless access point, an FTM session method, a terminal based on the FTM session method, and a server based on the method for selecting a wireless access point.

In the solutions disclosed in the embodiments of this application, a terminal sends a query request to a server, where the query request carries a query condition, after receiving the query request sent by the terminal, the server determines, in multiple APs that support an FTM mechanism, a target AP according to stored service capability information of each of the multiple APs that support the FTM mechanism and the query condition, and sends, to the terminal, a stored MAC address of the target AP and information about a frequency band and a channel that are used by the target AP, and the terminal scans for, according to the MAC address of the target AP, the target AP in the frequency band and on the channel used by the target AP, and performs FTM session negotiation with the target AP.

Because the target AP is an AP that supports the FTM mechanism, the terminal may directly scan for, according to the MAC address of the target AP, the target AP in the frequency band and on the channel used by the target AP, and may directly perform FTM session negotiation with the target AP. This avoids consumption of a time and bandwidth caused by positioning, by means of multiple times of scanning, the AP that supports the FTM mechanism, thereby improving efficiency of the FTM session negotiation, and improving FTM interaction efficiency.

The technical solutions according to embodiments of the present disclosure are clearly described in the following with reference to the accompanying drawings. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 2:
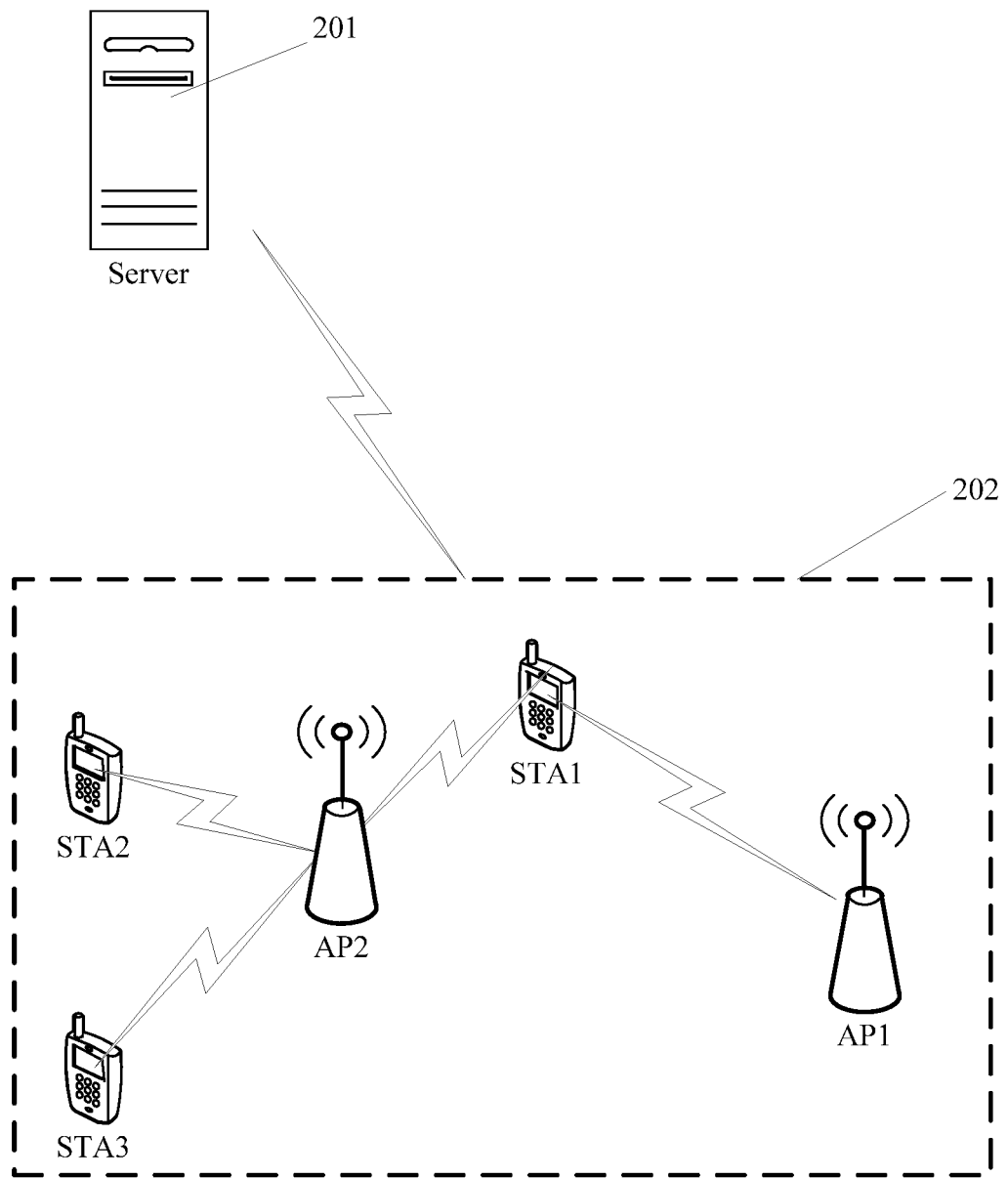
FIG. 2 is a schematic diagram of a network architecture of selecting a wireless access point according to an embodiment of this application.

FIG. 2 shows a network architecture to which a method for selecting a wireless access point is applicable according to an embodiment of this application. Compared with the network architecture shown in FIG. 1, in this embodiment of this application, a server 201 having data obtaining and data analysis functions is added. The server 201 is configured to obtain service capability information reported by APs that support an FTM mechanism and that are deployed in one or more different positioning areas 202, and when a station that supports the FTM mechanism initiates a query request, return, to the station according to the service capability information reported by the APs that support the FTM mechanism, information about an AP that can be used as an FTM responder.

The positioning area 202 may be an area having a particular geographical range. For example, the positioning area 202 may be an indoor area covered by a building. FIG. 2 only shows a relationship between an AP and a station that are in one positioning area. However, it can be understood that when the network architecture includes multiple positioning areas, each positioning area may include multiple APs and multiple stations, and the positioning areas have basically similar compositions.

The service capability information reported by the AP may include a MAC address of the AP, position information of the AP, a frequency band and a channel number that are used by the AP, and a value of each FTM parameter in an FTM parameter set supported by the AP, where the value may be a specific value or may be a value set or a value range for different FTM parameters in the FTM parameter set.

The MAC address of the AP is used to uniquely identify the AP such that an FTM interaction requester can subsequently scan for the AP based on the MAC address of the AP.

The position information of the AP may be used as optional service capability information such that a server can subsequently more precisely select an AP that is in a scanning range of a terminal. The position information of the AP may include position coordinates of the AP, or may further include identification information used to identify a position of the AP, for example, an identifier of a building in which the AP is deployed or identification information of a specific floor on which the AP is deployed in a building. The position information of the AP may be used to determine whether the AP is in a scanning range of an FTM requester.

The frequency band and the channel number that are used by the AP may be used as optional service capability information such that the FTM requester can subsequently directly scan for, according to the frequency band and the channel number that are used by the AP, the AP in the frequency band and on a channel corresponding to the channel number, avoiding scanning for the AP in each frequency band and on each channel.

The value set or the value range of each FTM parameter in the FTM parameter set supported by the AP is also optional service capability information. The service capability information includes each FTM parameter in the FTM parameter set supported by the AP. The FTM parameter set is used to provide a basis for the server to determine whether the AP has an FTM parameter expected by the FTM requester such that an AP selected by the server and the FTM requester can reach a consensus on an FTM parameter by means of negotiation in an FTM session negotiation process.

It should be noted that the MAC address of the AP and the frequency band and the channel number that are used by the AP may be used as the service capability information and may be reported to the server, or may be used as identification information required for scanning for the AP and may be sent to the server together with the service capability information. Therefore, the server stores a correspondence among the MAC address corresponding to the AP, a frequency band and a channel number that are currently used by the AP, and the service capability information.

In the embodiments of this application, the FTM parameter in the FTM parameter set may include two main types of parameters, time scheduling information and an FTM format and bandwidth.

The time scheduling information may include any one or more of the following several FTM parameters, a number of burst exponent, burst duration, FTMs per burst, minimum delta FTM (Min Delta FTM), or a burst period.

For example, referring to Table 1, Table 1 shows meanings of each FTM parameter of the time scheduling information and an FTM format and bandwidth in the FTM parameter set.

TABLE 1

| Parameter | Usage of parameter |
| --- | --- |
| Number of burst exponent | A total quantity of FTM bursts (FTM bursts) allowed in one FTM session |
| Burst duration | Used to describe allowed duration of each FTM Burst if an FTM responder receives an initial FTM request sent by an FTM requester, where the 802.11 standards define a total of 10 discrete values from 250 microseconds (μs) to 128 milliseconds (ms) |
| FTMs per burst | Used to describe an allowed quantity of times FTM frames are exchanged in each FTM burst if an FTM responder receives an initial FTM request sent by an FTM requester |
| Min delta FTM | Used to describe minimum delta FTM allowed in each FTM burst, that is, a minimum time interval between two consecutively sent FTM frames, if an FTM responder receives an initial FTM request sent by an FTM requester |
| Burst period | Used to describe an allowed time interval between start moments of two consecutive FTM bursts if an FTM responder receives an initial FTM request sent by an FTM requester, where a length of a burst period is greater than that of burst duration. That is, in one burst period, a period of time (burst duration) is used for FTM interaction, and in another period of time, FTM interaction pauses |
| FTM format and bandwidth | Used to describe a supported FTM format and bandwidth used in an FTM interaction stage if an FTM responder receives an initial FTM request sent by an FTM requester |

When a different AP is used as an FTM responder, values of parameters that are shown in Table 1 and that can be supported by the AP are also different. For example, an FTM format may be one of formats such as non-high throughput (Non-HT), high throughput-mixed (HT-mixed), or very high throughput (VHT). A transmission bandwidth used during transmission may be 5 megahertz (MHz), 10 MHz, 20 MHZ, 40 MHz, 80 MHz, or 160 MHz.

It can be understood that each FTM parameter in the FTM parameter set may have multiple values. Therefore, for multiple FTM parameters in the FTM parameter set, there are multiple different value combinations. Based on different service capabilities of different APs that support the FTM mechanism, the different APs have a constraint on a combination of different values of different FTM parameters. In the embodiments of this application, a constraint parameter is used to define a constraint relationship between values of different FTM parameters for an AP. Therefore, optionally, in the embodiments of this application, in addition to including the FTM parameters included in Table 1, the FTM parameter set may include a constraint parameter used to define a constraint relationship between the FTM parameters. The AP may define a value of an FTM parameter by setting a value of a constraint parameter. For example, referring to Table 2, Table 2 shows some constraint parameters included in the FTM parameter set and meanings of the constraint parameters. The constraint parameter in the embodiments of this application may include any one or more of the constraint parameters in Table 2.

TABLE 2

| Parameter | Brief description about usage of parameter |
| --- | --- |
| Maximum session duration (Max Session Duration) | Used to describe allowed maximum duration of one FTM session if an FTM responder receives an initial FTM request sent by an FTM requester, where the duration of one FTM session may be obtained using the formula: T(Burst Period)*$2^{Number\ of\ Burst\ Exponent}$<br>Note: In the foregoing formula, T(Burst Period) refers to a real time length represented by a value of a burst period. For example, as defined in 802.11, when a burst period is equal to 1, it represents that a time length is 100 ms. |
| Maximum duty cycle (Max Duty Cycle) | Used to describe an allowed maximum duty cycle of each FTM burst in an FTM session if an FTM responder receives an initial FTM request sent by an FTM requester. The duty cycle of the FTM burst may be obtained using the formula:<br>T(Burst Duration)/T(Burst Period)<br>Note: In the foregoing formula, T(Burst Duration) and T(Burst Period) refer to real time lengths represented by values of burst duration and a burst period. |
| Maximum FTM frequency (Max FTM Frequency) | Used to describe an allowed maximum FTM frequency of each FTM burst in an FTM session if an FTM responder receives an initial FTM request sent by an FTM requester. An FTM frequency in the FTM burst may be obtained using the formula:<br>FTMs per Burst/T(Burst Duration) |

For example, for an AP, FTM parameters in the AP are as follows A value of a burst period is allowed to be within [1, 100], and a value of a number of burst exponent is allowed to be within [0, 1, . . . , 6], but a value combination of the two FTM parameters is limited. The two parameters are restricted by maximum duration of total session duration (that is, Max Session Duration) that can be supported by the AP. It is assumed that a parameter value of the constraint parameter Max Session Duration of the AP is 10 seconds. When the AP expects that a value of "burst period" is 100 (that is, 10 seconds), a value of a "number of burst exponent" can be only 0. When the AP expects that a value of a "burst period" is 10 (that is, 1 second), a value of a "number of burst exponent" may be 0, 1, 2, or 3. When the AP expects that a value of a "burst period" is 1 (that is, 0.1 second), a value of a "number of burst exponent" may be 0, 1, 2, 3, 4, 5, or 6.

It can be understood that when multiple APs respectively report constraint parameters that are respectively set by the APs, the server stores the constraint parameters set by the multiple APs. The constraint parameter set by each of the multiple APs is used to constrain values of FTM parameters supported by each of the multiple APs. Each AP may set any one or more constraint parameters in Table 2. The constraint parameter set by each AP is used to constrain values of FTM parameters supported by the AP.

Further, in the embodiments of this application, the service capability information of the AP node may further include a communication load status of the AP, for example, a parameter such as a fine-grained channel duty cycle of the AP node that can reflect a communication load status.

The service capability information of the AP may further include a service schedule of the AP. The service schedule is used to indicate a period of time within which the AP can provide a service. The AP can be used as an FTM responder only when the AP can provide a service at a current moment. For example, some APs cannot be used as or are not expected to be an FTM responder because the APs may be powered off within a particular period of time, or the like. Therefore, the AP may report a specific period of time within which the AP can be used as an FTM responder.

It can be understood that after the AP reports the service capability information to the server, if the service capability information of the AP changes, the AP may further report the changed service capability information to the server such that the server updates the corresponding service capability information of the AP. Certainly, the AP may alternatively report the service capability information of the AP at regular intervals such that the server can ensure that stored service capability information of the AP is consistent with actual service capability information of the AP.

To improve efficiency of finding an FTM responder by the FTM requester, in the embodiments of this application, the FTM requester may initiate a query request to the server before scanning for a surrounding AP that supports the FTM mechanism such that the server finds an AP that meets a condition of being an FTM responder and that is in a specified range of the FTM requester.

It can be understood that in the network architecture in FIG. 2, when a station expects to perform positioning based on the FTM mechanism or determine a distance between the station and a surrounding AP that supports the FTM mechanism, the station may be used as an FTM requester.

The following describes a method for selecting a wireless access point provided in the embodiments of this application using an example in which a station is a terminal and the station expects to perform positioning based on an FTM mechanism. It can be understood that the terminal in the embodiments of this application may be a terminal that supports the FTM mechanism. For example, the terminal may be a mobile phone, a notebook computer, or another intelligent terminal that supports the FTM mechanism.

Figure 3:
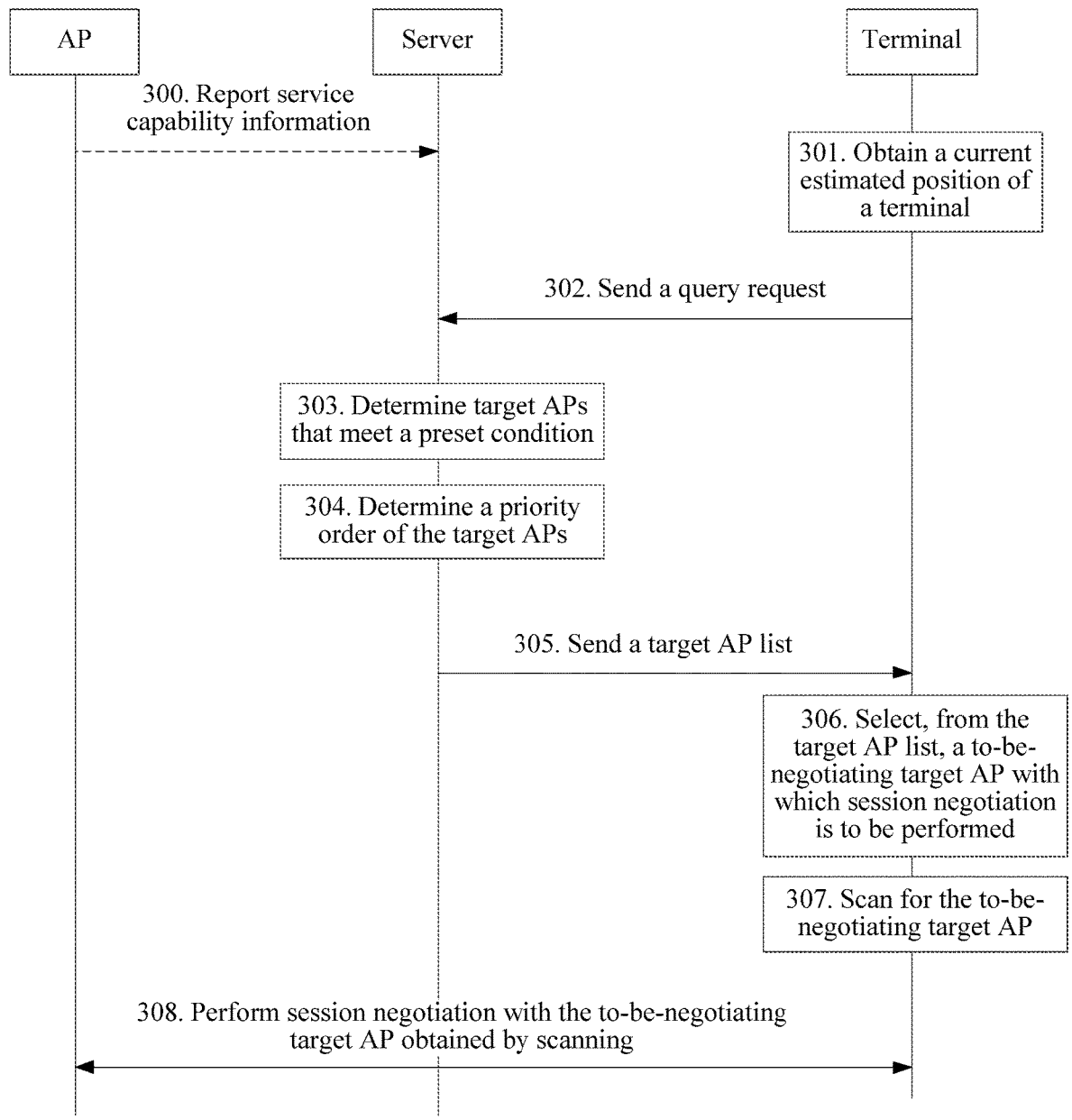
FIG. 3 is a schematic interactive flowchart of a method for selecting a wireless access point according to an embodiment of this application.

With reference to FIG. 2, referring to FIG. 3, FIG. 3 is a schematic interactive flowchart of an embodiment of a method for selecting a wireless access point according to the embodiments of this application. The method in this embodiment may include the following steps.

Step 301: A terminal used as an FTM requester obtains a current estimated position of the terminal.

The estimated position may be estimated current geographical position coordinates of the terminal, or a position identifier used to identify a position of the terminal. For example, the estimated position may be an identifier of a building in which the terminal is currently located, an identifier of a floor on which the terminal is located in a building, an identifier of the terminal, or the like.

The estimated position may be determined in some coarse-grained positioning manners. For example, the estimated position is determined using a positioning mechanism based on a cellular base station signal, a positioning mechanism based on WI-FI received signal strength indicator (RSSI) fingerprint matching, or an inertial navigation sensor, a baroceptor, a magnetic sensor, or the like on a mobile phone. Compared with a position of the terminal that is determined based on FTM, precision of the estimated position determined in the coarse-grained positioning manners is relatively low.

Certainly, information about the estimated position may also be manually entered by a user. For example, although the user cannot precisely determine specific longitude-latitude coordinates of the terminal or a specific position of the terminal relative to a building in which the terminal is located, the user determines an identifier of a building in which the terminal is located or a position of the building, and enters the identifier of the building or the position of the building into the terminal as the estimated position of the terminal.

Optionally, before step 301, the method may further include step 300, where a server receives service capability information reported by multiple APs that support an FTM mechanism, and stores a correspondence between the multiple APs that support the FTM mechanism and the service capability information of the multiple APs. It can be understood that the service capability information of the multiple APs may separately include service capability information corresponding to each AP. The server may distinguish between different APs using stored names or MAC addresses of the APs, and obtain service capability information corresponding to the different APs.

Certainly, in consideration that an AP may also report service capability information to the server when a service capability of the AP changes, step 300 may also be performed when the server receives a query request or processes a query request.

Step 302: The terminal sends a query request to a server.

The query request is used to request the server to return, to the terminal, information about an AP that supports the FTM mechanism and that can be obtained by the terminal by scanning. The query request carries a query condition.

In an optional implementation, the query condition may include the estimated position of the terminal. Optionally, the query request may further carry a scanning range set by the terminal. The scanning range is used to indicate a position range in which an AP used as an FTM responder is located. Only when an AP that supports FTM is located in the scanning range set by the terminal, the AP can be used as an FTM responder corresponding to the terminal. The scanning range is a position area using the estimated position of the terminal as a reference. For example, the scanning range may be an indoor position area of a building in which the terminal is located, or a position area of a floor on which the terminal is located, or a position area constituted using the estimated position of the terminal as a circle center and a specified distance as a radius.

In another optional implementation, the query condition carried in the query request may further include a target value of each FTM parameter in an FTM parameter set. The target value may be a target value set including one or more values, or a target value range. The target value of the FTM parameter may be understood as a value of an FTM parameter that the terminal expects to use during FTM session negotiation. For example, the query request may carry a target value corresponding to each of the six FTM parameters in Table 1, for example, a value set or a target value range corresponding to each FTM parameter.

Step 303: The server determines, in multiple APs that currently support an FTM mechanism and according to stored service capability information of the APs, a target AP that meets a preset condition.

The preset condition may include one or more of the following possibilities.

In a possible case, the preset condition may be as follows. An AP that supports the FTM mechanism can provide a service at a current moment, that is, the current moment is in a period of time that is set by the AP that supports the FTM mechanism and within which a service can be provided. This possible preset condition is an optional preset condition. In an actual application, the server may consider by default each AP corresponding to currently stored service capability information as an AP that can currently provide a service. In this case, the server does not need to determine whether an AP can currently provide a service. For example, when an AP that supports the FTM mechanism is not allowed to provide a service, and the AP proactively instructs the server to delete service capability information of the AP, the server stores service capability information of only an AP that supports the FTM mechanism and that can currently provide a service. Therefore, the server does not need to determine whether the AP can meet a condition of providing a service at a current moment.

In another possible case, when the query condition includes the estimated position of the terminal and the scanning range set by the terminal, the preset condition may be as follows. The estimated position of the terminal is used as a reference, and a position is in the scanning range set by the terminal. Therefore, if a position of an AP is in a range determined according to the estimated position of the terminal and the scanning range set by the terminal, the AP is a target AP. A position area may be determined according to the estimated position of the terminal and the scanning range set by the terminal, to analyze position information of the multiple APs. If an AP is located in the position area, it is determined that the AP meets the preset condition. The position area may be a geographical position area, or may be an area corresponding to a building or an area corresponding to a floor in a building.

For example, when the scanning range is a position area with the estimated position of the terminal as a center and having a specified radius, it may be determined, based on position information of the AP, whether the AP is located in the position area corresponding to the scanning range. For another example, when the scanning range is a space area corresponding to a building in which the terminal is located, it may be determined, according to the estimated position of the terminal and position information of the AP, whether the AP and the terminal are located in a same building. If the AP and the terminal are located in a same building, the AP is located in the scanning range set by the terminal. If the AP and the terminal are located in different buildings, the AP is not located in the scanning range set by the terminal.

It can be understood that if the target AP is an AP that supports the FTM mechanism and that is located in the scanning range set by the terminal, the terminal directly performs FTM session negotiation with the target AP. In this way, the AP that supports the FTM mechanism can be found without requiring multiple times of scanning, thereby reducing a consumed time required for the terminal to find the AP that supports the FTM mechanism.

It should be noted that in an actual application, the scanning range may also be set by the server. However, in consideration that maximum scanning distances of different terminals are different, that a terminal sets its own scanning range is used as a implementation.

In still another possible case, when the query condition includes a value of an FTM parameter expected by the terminal, the preset condition may include the following. A target value that is of the FTM parameter in the FTM parameter set and that is expected by the terminal is supported. That is, for any FTM parameter in the FTM parameter set, if an intersection set of a value (which may be a value set or a value range) of the FTM parameter in an AP and a value (for example, which may be a value set or a value range) of the FTM parameter expected by the terminal is a non-empty set, it indicates that the AP can support a target value that is of the FTM parameter in the FTM parameter set and that is expected by the terminal, and the AP is a target AP.

In an optional implementation, the preset condition is as follows. The value that is of the FTM parameter in the FTM parameter set and that is expected by the terminal is supported by the value of the FTM parameter in the FTM parameter set in the AP in order to determine an AP that performs FTM session negotiation with the terminal at a relatively high success rate.

It can be understood that a value of an FTM parameter in the target AP and the value of the FTM parameter expected by the terminal has an intersection set. Therefore, when the terminal used as an FTM responder performs FTM session negotiation with the target AP, a success probability of negotiating an FTM parameter is relatively high. This further helps resolve a problem that because of a low success probability of session negotiation between the terminal and an AP, a long time and a relatively large amount of bandwidth are consumed during the negotiation.

To reduce a time consumed for positioning an AP that supports FTM and improve a success probability of session negotiation between the terminal and the AP that supports the FTM mechanism, in an implementation, the preset condition may include both of the following conditions. The estimated position of the terminal is used as a reference, and a position is in the scanning range set by the terminal, a value that is of the FTM parameter in the FTM parameter set and that is expected by the terminal is supported.

In another possible case, the preset condition may include the following. A constraint parameter of the AP and the FTM parameter expected by the terminal meet a specified constraint condition.

The constraint condition may include any one or more of the following.

When the query condition includes a value of a number of burst exponent expected by the terminal and a value of a burst period expected by the terminal, the constraint condition may be a first constraint condition met by the values of the number of burst exponent and the burst period in the FTM parameter set that are expected by the terminal and a value of max session duration set by the AP, that is, $T(\text{Burst Period expected by the terminal}) * 2^{\text{Number of Burst Exponent expected by the terminal}} < \text{Max Session Duration}$.

When the query condition includes a value of burst duration expected by the terminal and the value of the burst period expected by the terminal, the constraint condition may be a second constraint condition met by the values of the burst duration and the burst period in the FTM parameter set that are expected by the terminal and a value of a max duty cycle set by the AP, that is, $T(\text{Burst Duration expected by the terminal})/T(\text{Burst Period expected by the terminal}) < \text{Max Duty Cycle}$.

When the query condition includes a value of FTMs per burst expected by the terminal and the value of the burst duration expected by the terminal, the constraint condition may be a third constraint condition met by the values of the FTMs per burst and the burst duration in the FTM parameter set that are expected by the terminal and a value of max session duration set by the AP, that is, $\text{FTMs per Burst expected by the terminal}/T(\text{Burst Duration expected by the terminal}) < \text{Max FTM Frequency}$.

For specific definitions of the constraint parameters set by the AP in the foregoing three constraint conditions, refer to related definitions in Table 2. Because the constraint parameters are set by the AP, FTM parameters in the expressions of the constraint parameters should be FTM parameters set by the AP. For example, in an example of Max Session Duration set by the AP, Burst Period in the expression of Max Session Duration is a burst period set by the AP, and correspondingly, Number of Burst Exponent is Number of Burst Exponent supported by the AP. Therefore, Max Session Duration set by the AP may be expressed as Max Session Duration=$T(\text{Burst Period supported by the AP}) * 2^{\text{Number of Burst Exponent supported by the AP}}$.

Correspondingly, the maximum duty cycle (Max Duty Cycle) set by the AP may be expressed as Max Duty Cycle=$T(\text{Burst Duration supported by the AP})/T(\text{Burst Period supported by the AP})$, and the maximum FTM frequency Max FTM Frequency set by the AP may be expressed as Max FTM Frequency=FTMs per Burst supported by the AP/$T(\text{Burst Duration supported by the AP})$, where $T(\text{Burst Period supported by the AP})$ indicates a real time length corresponding to the value of the burst period supported by the AP, and $T(\text{Burst Duration supported by the AP})$ indicates a real time length corresponding to the value of the burst duration supported by the AP.

Similar to the definitions of the constraint parameters in Table 2, in the foregoing three constraint conditions, $T(\text{Burst Duration expected by the terminal})$ indicates a real time length corresponding to the value of the burst duration expected by the terminal, and $T(\text{Burst Period expected by the terminal})$ indicates a real time length corresponding to the value of the burst period expected by the terminal.

That the preset condition includes one or more of the foregoing constraint conditions is an optional implementation in order to ensure that on the premise that there is a constraint relationship between FTM parameters set by APs, a determined AP can still meet the values of the FTM parameters expected by the mobile terminal.

For ease of understanding, for example, on the premise that the preset condition includes multiple foregoing possible cases, it is assumed that the server determines that an AP can currently provide an FTM service, and a position of the AP is in the scanning range set by the terminal. It is assumed that value sets or value ranges that correspond to the FTM parameters in the FTM parameter set and the constraint parameters in the AP are shown in Table 3.

TABLE 3

| Parameter | Supported value set or value range |
| --- | --- |
| Number of burst exponent | 1, 2, . . . , 10 |
| Burst duration | 2, 3, . . . , 11 |
| FTMs per burst | [1, 5] |
| FTM format and bandwidth | 4, 6, 8, 9, 10, . . . , 16 |
| Burst period | [1, 100] |
| Max session duration | 10 seconds (s) |
| Max duty cycle | 20% |
| Max FTM frequency | 5000 hertz (Hz) |

It is assumed that in the query request of the terminal, expected target value sets or target value ranges of the FTM parameters in the FTM parameter set are shown in Table 4.

TABLE 4

| Parameter | Supported value set or value range |
| --- | --- |
| Number of burst exponent | 3 (8) |
| Burst duration | 4 (0.001 s) |
| FTMs per burst | 4 |
| FTM format and bandwidth | 9, 11 |
| Burst period | 10 (1 s) |

It can be learned by means of comparison between Table 3 and Table 4 that an expected target value set or target value range of an FTM parameter in the query request belongs to a value set or a value range of an FTM parameter supported by the AP. That is, an intersection set of the expected value set or value range of the FTM parameter in the query request and the FTM parameter supported by the AP is a non-empty set.

The server may further check whether an expected target value set or target value range of an FTM parameter in the query request and the constraint parameter of the AP meet the foregoing three constraint conditions.

It can be learned according to Table 4 that for the terminal, T(Burst Period)*$2^{Number\ of\ Burst\ Exponent}$=1 s*8=8 s. It can be learned from Table 3 that the value of Max Session Duration set by the AP is 10 s. Therefore, the first constraint condition is met.

It can be learned according to Table 4 that for the terminal, T(Burst Duration)/T(Burst Period)=0.001/1=0.1%. It can be learned from Table 3 that the value of Max Duty Cycle set by the AP is 20%. Therefore, the second constraint condition is met.

It can be learned according to Table 4 that for the terminal, FTMs per Burst/T(Burst Duration)=4/0.001 s=4000 Hz, and it can be learned from Table 3 that a max FTM frequency set by the AP is 5000 Hz. Therefore, the third constraint condition is met.

It can be learned that the AP meets all the preset conditions. Therefore, the server can determine that the AP is a target AP.

In this embodiment of this application, for ease of distinguishing, the determined AP that meets the preset condition is referred to as the target AP. Actually, the target AP determined by the server may be considered as an AP that is used as an FTM responder corresponding to FTM interaction initiated by the terminal.

It should be noted that generally, there are multiple target APs that meet the preset condition, and the server can determine all target APs that meet the preset condition. Certainly, an upper quantity limit may be set. For example, a quantity of determined target APs that meet the preset condition is not greater than a preset maximum quantity. Optionally, in consideration that the terminal needs to perform FTM interaction with at least three FTM responders when positioning is performed based on FTM, the server may determine at least three target APs that meet the preset condition.

Step 304: The server determines a priority order of target APs according to a preset prioritization rule.

Step 304 is applicable when at least two target APs are determined. The preset prioritization rule is based on quality of FTM interaction provided by the APs. That is, higher quality of FTM interaction performed between an AP and the terminal indicates a higher priority of the AP.

The preset prioritization rule may have the following one or more possibilities.

A possible preset prioritization rule may be a priority of an AP that is in the at least two target APs and whose position is closer to the estimated position of the terminal is higher.

Another possible preset prioritization rule may be a priority of an AP that is in the at least two target APs and whose FTM format and bandwidth has a larger value or whose constraint parameter has a larger value in the FTM parameter set is higher. For example, during FTM interaction, wider channel bandwidth used for transmitting an FTM frame indicates higher temporal resolution for obtaining a TOF, and this is more helpful to improve positioning precision. Therefore, a larger value of an FTM format and bandwidth indicates a higher priority of the AP. For another example, for a constraint parameter of the AP, a larger value of maximum session duration (Max Session Duration) indicates longer session duration and a higher priority of the AP. For another example, a larger value of a maximum duty cycle (Max Duty Cycle) indicates a higher priority of the AP. For another example, a higher maximum FTM frequency (Max FTM Frequency) indicates a shorter update period of FTM interaction, better real-time quality of positioning the terminal, and a higher priority of the AP.

Still another possible preset prioritization rule may be a priority of an AP that is in the at least two target APs and whose communication load is lower is higher.

It should be noted that step 305 is an optional step when there are at least two target APs in order to ensure that the mobile terminal can select an AP having a higher priority to perform session negotiation in order to improve session quality of a subsequent FTM session, and improve precision and real-time quality of FTM positioning.

Step 305: The server sends a target AP list to the terminal.

The target AP list includes at least MAC addresses of the determined target APs, and frequency bands and channel numbers that are currently used by the target APs.

Optionally, frequency bands and channel numbers used by different APs or by a same AP at different moments may be different. Therefore, to ensure that the terminal can more quickly and accurately obtain the target APs by scanning, in addition to the MAC addresses of the target APs, the list may include the frequency bands and the channel numbers that are used by the target APs. In this way, in the frequency bands and on channels corresponding to the channel numbers used by the target APs, the terminal can scan the target APs according to the MAC addresses of the target APs.

Certainly, in consideration that parameters such as the position and the scanning range of the terminal may frequently change, and the query condition of the terminal correspondingly changes, to ensure that when the query condition of the terminal changes, the terminal can still relatively quickly obtain, by scanning, an AP that supports the FTM mechanism or an AP that supports the FTM mechanism and that can successfully negotiate an FTM interaction parameter with the terminal, the list may further include service capability information of the target APs, for example, one or more of the following service capability information, position information of the target APs, a value set or a value range that is of an FTM parameter in an FTM parameter set and that is supported by the target APs, a value that is of a constraint parameter in the FTM parameter set and that is supported by the target APs, or current communication load of the target APs. In this way, when the query condition of the terminal changes, the terminal can still determine again, based on the service capability information of the target AP, an AP that meets the changed query condition.

Certainly, to improve communication quality during FTM interaction, the list may further include a priority order of the target APs. Different target APs in the list may be identified or distinguished using names or MAC addresses of the target APs.

It should be noted that directly sending the priority order of the determined target APs to the terminal is only an implementation. In an actual application, the target APs in the list may further be sorted according to the priority order. For example, a target AP having a high priority is also top ranked in the list. In this way, the terminal can select, according to an order of the target APs in the list, a target AP top ranked to perform FTM session negotiation.

It can be understood that a quantity of target APs included in the list may be a total quantity of all determined target APs. Alternatively, the list may include target APs whose quantity is not greater than a preset quantity. Optionally, in consideration of a positioning requirement of the terminal, the list may include MAC addresses, currently used frequency bands and channel numbers, service capability information, and a priority order that correspond to at least three target APs.

It should be noted that sending the MAC addresses, the currently used frequency bands and channel numbers, the service capability information, and the like of the target APs in a list form is only an implementation. In an actual application, related information of the target APs may also be sent in another form. This is not limited herein.

Step 306: The terminal selects, from the target AP list according to the priority order of the target APs in the target AP list, a to-be-negotiating target AP with which session negotiation is to be performed.

For ease of distinguishing, in this embodiment of this application, a target AP that is selected by the terminal from multiple target APs returned by the server and that is to perform session negotiation is referred to as a to-be-negotiating target AP.

The terminal may select at least three target APs that have higher priorities as to-be-negotiating target APs according to the priority order of the target APs, and perform a subsequent operation of sequentially scanning for each to-be-negotiating target AP.

In an actual application, alternatively, the terminal may select, according to the priority order of the target APs in the target AP list, one target AP whose priority is highest and that has not performed session negotiation as a to-be-negotiating target AP each time, and perform subsequent operations of scanning for the to-be-negotiating target AP and performing FTM session negotiation, until at least three target APs that can be used as an FTM responder are determined.

In this embodiment of this application, the server may collect in advance MAC addresses and currently used frequency bands and channel numbers of all APs in a management range of the server, and service capability information including information such as positions of the APs, and select, according to the estimated position of the terminal and the specified scanning range, a list of APs that are suitable to be used as an FTM responder corresponding to the terminal. All APs included in the list of APs are APs that are located in the scanning range set by the terminal and that support the FTM mechanism. A value of an FTM parameter in each AP in the list of APs can meet a value of an FTM parameter expected by the terminal for the FTM session negotiation, thereby avoiding an undesirable time delay and waste of bandwidth that are caused when the terminal needs to scan for and determine, one by one, APs that support the FTM mechanism. In addition, a success rate of session negotiation between the terminal and an AP in the target AP list is relatively high, reducing consumed bandwidth and a consumed time that are caused by the terminal when blindly performing FTM session negotiation with each AP, thereby improving efficiency of positioning an FTM responder by the terminal and reducing bandwidth and a time that are consumed for positioning an FTM responder.

In addition, prioritizing multiple APs that are suitable to be used as an FTM responder helps the terminal select an AP using high bandwidth, within a short distance, and having low service costs to perform FTM interaction, thereby improving quality of the FTM interaction.

It can be understood that this embodiment of this application is described using an example in which the target AP list sent by the server includes the priority order of the target APs. However, on the premise that the server does not prioritize the multiple target APs, the terminal may prioritize, according to the service capability information of the target APs returned by the server, the multiple target APs returned by the server, and then according to a priority order of the target APs, select a to-be-negotiating target AP that is to perform session negotiation. For a specific prioritization rule, refer to the prioritization rule used by the server for performing prioritization.

Certainly, when the target AP list does not include the priority order of the target APs, the terminal may randomly select at least three target APs as target APs that are to perform session negotiation.

Step 307: The terminal scans for and determines the to-be-negotiating target AP according to MAC address and currently applied frequency band and channel number of the to-be-negotiating target AP in the target AP list.

Step 308: The terminal performs session negotiation with the to-be-negotiating target AP obtained by scanning.

When a MAC address of a to-be-negotiating target AP and a frequency band and a channel number that are used by the to-be-negotiating target AP are determined, the terminal can directly perform scanning according to the current operating frequency band and the current operating channel of the to-be-negotiating target AP, to position an AP whose MAC address is the MAC address of the to-be-negotiating target AP.

In addition, because the to-be-negotiating target AP is an AP that supports the FTM mechanism, the terminal can directly perform session negotiation with the to-be-negotiating target AP obtained by scanning.

In this embodiment of this application, FTM session negotiation and positioning operations can be completed according to a negotiation and interaction procedure in the FTM mechanism in the 802.11 standards.

Optionally, when the terminal detects that the estimated position of the terminal changes, the terminal can determine again an updated estimated position of the terminal, and detect, according to the updated estimated position, the scanning range set by the terminal, and service capability information such as a position of each target AP in the target AP list returned by the server, supported values of an FTM parameter in the FTM parameter set and a constraint parameter, and communication load, whether a target AP that meets the foregoing preset conditions currently exists in the target AP list in order to determine again an AP with which FTM session negotiation needs to be performed. If a target AP that meets the foregoing preset conditions exists, the terminal can directly perform FTM session negotiation with at least three target APs that meet the preset conditions such that when the position of the terminal changes, the terminal can still quickly position an AP that supports the FTM mechanism and whose success rate of performing FTM session negotiation is relatively high.

Certainly, after the estimated position of the terminal changes, if the terminal cannot determine, in the target AP list, a target AP that meets the foregoing preset conditions, the terminal can send a query request to the server again, to request the server to return again a list of APs that can be used as an FTM responder.

Figure 4:
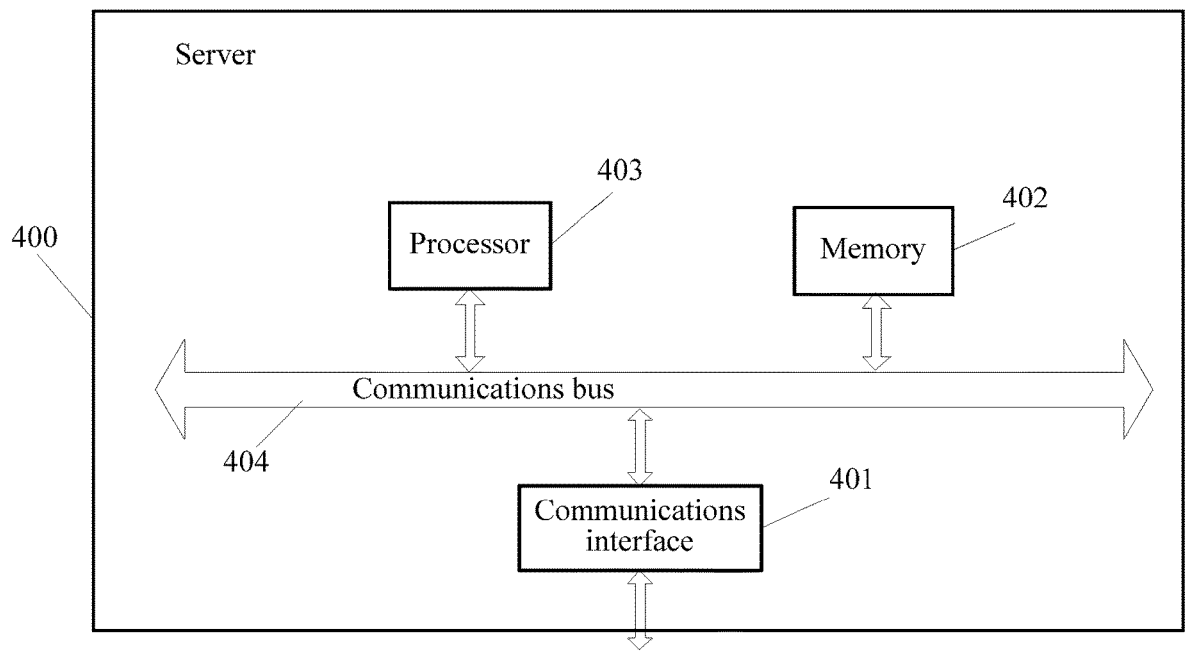
FIG. 4 is a possible schematic structural diagram of a server according to an embodiment of this application.

FIG. 4 is a possible schematic structural diagram of the server in the foregoing embodiment.

The server 400 may include a communications interface 401 configured to receive a query request sent by a terminal, where the query request carries a query condition, a memory 402 configured to store service capability information of each of multiple wireless access points that support a fine time measurement FTM mechanism, MAC addresses of the multiple APs, and information about frequency bands and channels that are used by the multiple APs, where the service capability information of each of the multiple APs includes position information of each of the multiple APs, and a processor 403 configured to determine a target AP in the multiple APs according to the stored service capability information of each of the multiple APs and the query condition.

The communications interface 401 is further configured to send, to the terminal, a stored MAC address of the target AP and stored information of a frequency band and a channel that are used by the target AP such that the terminal scans for, according to the MAC address of the target AP, the target AP in the frequency band and on the channel used by the target AP, and performs FTM session negotiation with the target AP.

In an actual application, the server may further include a communications bus 404. The communications interface, the processor, the memory, and the like may be connected using the communications bus.

It can be understood that the memory 402 is further configured to store program code and data that are used by the processor to perform the foregoing operation. FIG. 4 shows only a simplified design of the server. Certainly, the server may further include an internal memory, any quantity of controllers and communications units, and the like. All servers that can implement the present disclosure shall fall within the protection scope of this application.

Optionally, the query condition carried in the query request that is received by the communications interface includes an estimated position of the terminal and a scanning range set by the terminal.

The service capability information of each of the multiple APs that is stored in the memory includes position information of each of the multiple APs.

When determining, in the multiple wireless access points that support the fine time measurement FTM mechanism, the target AP according to the stored service capability information of each of the multiple APs, the processor 403 is configured to determine the target AP in the multiple APs according to the position information of each of the multiple APs, the estimated position of the terminal, and the scanning range set by the terminal, where a position of the target AP is in a range determined according to the estimated position of the terminal and the scanning range set by the terminal.

Optionally, the query condition carried in the query request that is received by the communications interface includes a value of an FTM parameter expected by the terminal during the FTM session negotiation.

The service capability information of each of the multiple APs that is stored in the memory includes a value of an FTM parameter supported by each of the multiple APs.

When determining, in the multiple wireless access points that support the fine time measurement FTM mechanism, the target AP according to the stored service capability information of each of the multiple APs, the processor 403 is configured to determine the target AP in the multiple APs according to the value of the FTM parameter supported by each of the multiple APs and the value of the FTM parameter expected by the terminal, where an intersection set of a value of an FTM parameter supported by the target AP and the expected value of the FTM parameter is a non-empty set.

Optionally, the FTM parameter that is supported by each of the multiple APs and that is stored in the memory or the FTM parameter that is expected by the terminal and that is received by the communications interface includes at least one of an FTM format and bandwidth, a number of burst exponent, burst duration, FTMs per burst, minimum delta FTM, or a burst period.

Optionally, the query condition carried in the query request that is received by the communications interface includes a value of a number of burst exponent expected by the terminal and a value of a burst period expected by the terminal.

The service capability information of each of the multiple APs that is stored in the memory includes a value of a constraint parameter set by each of the multiple APs, where the constraint parameter set by each of the multiple APs includes maximum session duration (Max Session Duration) used to constrain a value of a burst period and a value of a number of burst exponent that are supported by each of the multiple APs, where Max Session Duration= T(Burst Period supported by the AP) $*2^{Number\ of\ Burst\ Exponent\ supported\ by\ the\ AP}$, where T(Burst Period supported by the AP) indicates a real time length corresponding to the value of the burst period supported by each of the multiple APs.

When determining, in the multiple wireless access points that support the fine time measurement FTM mechanism, the target AP according to the stored service capability information of each of the multiple APs, the processor 403 is configured to determine the target AP in the multiple APs according to a value of the max session duration of each of the multiple APs, the value of the number of burst exponent expected by the terminal, and the value of the burst period expected by the terminal, where the value of the number of burst exponent expected by the terminal, the value of the burst period expected by the terminal, and a value of max session duration set by the target AP meet a first constraint condition, and the first constraint condition includes T(Burst Period expected by the terminal) $*2^{Number\ of\ Burst\ Exponent\ expected\ by\ the\ terminal}$<Max Session Duration, where T(Burst Period expected by the terminal) indicates a real time length corresponding to the value of the burst period expected by the terminal.

Optionally, the query condition carried in the query request that is received by the communications interface includes a value of burst duration expected by the terminal and the value of the burst period expected by the terminal.

The service capability information of each of the multiple APs that is stored in the memory includes a value of a constraint parameter set by each of the multiple APs, where the constraint parameter set by each of the multiple APs includes a maximum duty cycle (Max Duty Cycle) used to constrain the value of the burst period and a value of burst duration that are supported by each of the multiple APs, where Max Duty Cycle=T(Burst Duration supported by the AP)/T (Burst Period supported by the AP), where T(Burst Period supported by the AP) indicates a real time length corresponding to the value of the burst period supported by each of the multiple APs, and T(Burst Duration supported by the AP) indicates a real time length corresponding to the value of the burst duration supported by each of the multiple APs.

When determining, in the multiple wireless access points that support the fine time measurement FTM mechanism, the target AP according to the stored service capability information of each of the multiple APs, the processor 403 is configured to determine the target AP in the multiple APs according to a value of the max duty cycle of each of the multiple APs, the value of the burst duration expected by the terminal, and the value of the burst period expected by the terminal, where the value of the burst duration expected by the terminal, the value of the burst period expected by the terminal, and a value of a max duty cycle set by the target AP meet a second constraint condition, where the second constraint condition includes T(Burst Duration expected by the terminal)/T(Burst Period expected by the terminal)<Max Duty Cycle, where T(Burst Duration expected by the terminal) indicates a real time length corresponding to the value of the burst duration expected by the terminal, and T(Burst Period expected by the terminal) indicates the real time length corresponding to the value of the burst period expected by the terminal.

Optionally, the query condition carried in the query request that is received by the communications interface includes a value of FTMs per burst expected by the terminal and the value of the burst duration expected by the terminal.

The service capability information of each of the multiple APs that is stored in the memory includes a value of a constraint parameter set by each of the multiple APs, where the constraint parameter set by each of the multiple APs includes a maximum FTM frequency Max FTM Frequency used to constrain a value of FTMs per burst and the value of the burst duration that are supported by each of the multiple APs, where Max FTM Frequency=FTMs per Burst supported by the AP/T (Burst Duration supported by the AP), where T(Burst Duration supported by the AP) indicates a real time length corresponding to the value of the burst duration supported by each of the multiple APs.

When determining, in the multiple wireless access points that support the fine time measurement FTM mechanism, the target AP according to the stored service capability information of each of the multiple APs, the processor is configured to determine the target AP in the multiple APs according to a value of the max FTM frequency of each of the multiple APs, the value of the burst duration expected by the terminal, and the value of FTMs per Burst expected by the terminal, where the value of FTMs per Burst expected by the terminal, the value of the burst duration expected by the terminal, and a value of a max FTM frequency set by the target AP meet a third constraint condition, where the third constraint condition includes FTMs per Burst expected by the terminal/T(Burst Duration expected by the terminal) <Max FTM Frequency, where T(Burst Duration expected by the terminal) indicates the real time length corresponding to the value of the burst duration expected by the terminal.

Optionally, when there are at least two target APs, the processor 403 is further configured to prioritize the at least two target APs according to a preset prioritization rule, to obtain a priority order of the at least two target APs, where the prioritization rule includes one or more of the following. A priority of an AP that is in the at least two target APs and whose position is closer to the estimated position of the terminal is higher, a priority of an AP that is in the at least two target APs and whose FTM format and bandwidth has a larger value is higher, a priority of an AP that is in the at least two target APs and whose constraint parameter has a larger value is higher, or when the service capability information of each of the multiple APs further includes communication load of each of the multiple APs, a priority of an AP that is in the at least two target APs and whose current communication load is lower is higher.

The communications interface 401 is further configured to send the priority order of the at least two target APs to the terminal such that the terminal selects, according to the priority order, an AP with which FTM session negotiation needs to be performed.

Optionally, the communications interface is further configured to send service capability information of the target AP to the terminal such that the terminal determines again, based on the service capability information of the target AP when the query condition changes, an AP that meets the changed query condition.

Figure 5:
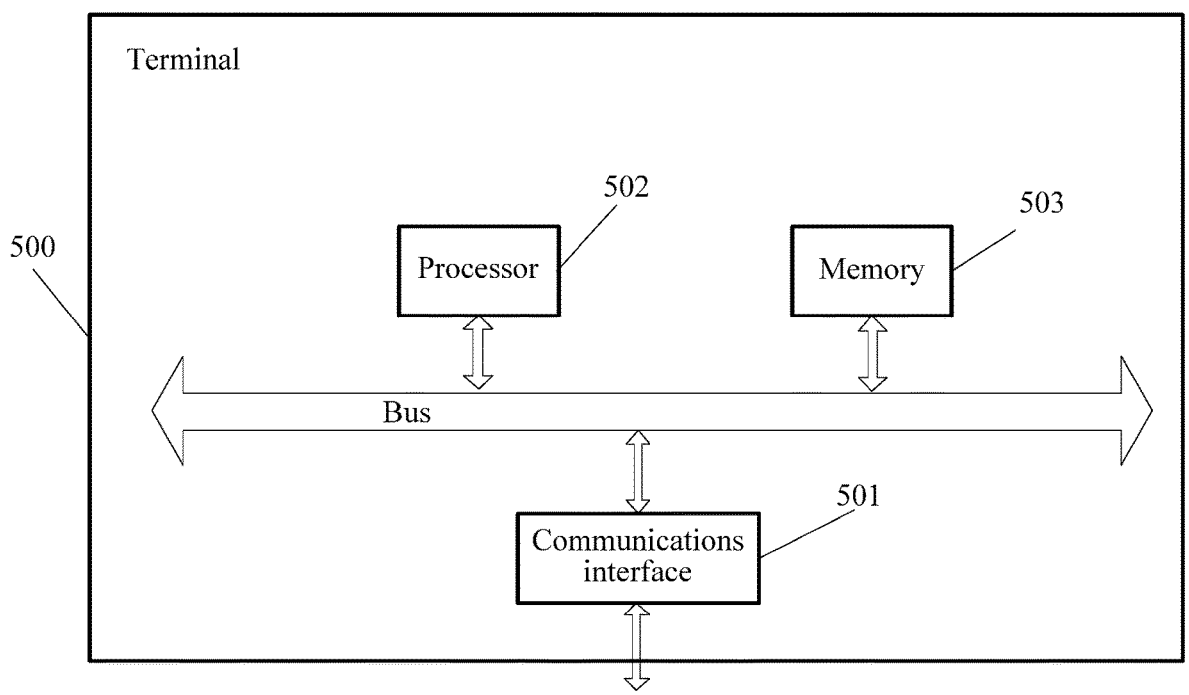
FIG. 5 is a possible schematic structural diagram of a terminal according to an embodiment of this application.

FIG. 5 is a possible schematic structural diagram of the terminal in the foregoing embodiment.

The terminal 500 may include a communications interface 501 configured to send a query request to a server, where the query request carries a query condition, obtain a MAC address of a target wireless access point and information about a frequency band and a channel that are used by the target AP, where the MAC address and the information are returned by the server, the target AP is an AP that supports a fine time measurement FTM mechanism, and the target AP meets the query condition, and a processor 502 configured to scan for, according to the MAC address of the target AP, the target AP in the frequency band and on the channel that are used by the target AP, and perform FTM session negotiation with the target AP when the target AP is obtained by scanning. It can be understood that the terminal may include a memory 503 configured to store program code and data that are used by the processor 502 to perform the foregoing operation such that the processor 502 reads and executes the program code and the data. The communications interface 501, the processor 502, and the memory 503 may be connected using a bus, Certainly, FIG. 5 shows only a simplified design of the terminal. Certainly, the terminal may further include an internal memory, any quantity of controllers and communications units, and the like. All terminals that can implement the present disclosure shall fall within the protection scope of this application.

Optionally, the query condition carried in the query request that is sent by the communications interface includes an estimated position of the terminal and a scanning range set by the terminal, and a position of the target AP is in a range determined according to the estimated position of the terminal and the scanning range set by the terminal.

Optionally, the query condition carried in the query request that is sent by the communications interface includes a value of an FTM parameter expected by the terminal during the FTM session negotiation, and an intersection set of a value of an FTM parameter supported by the target AP and the value of the FTM parameter expected by the terminal is a non-empty set.

Optionally, the communications interface 501 is further configured to obtain a priority order of at least two target APs that is returned by the server.

When performing FTM session negotiation with the target AP, the processor 502 is configured to select, from the at least two target APs according to the priority order, an AP with which FTM session negotiation needs to be performed to perform FTM session negotiation.

Optionally, the communications interface 501 is further configured to obtain service capability information of the target AP that is returned by the server, where the service capability information of the target AP includes at least one of position information of the target AP, the value of the FTM parameter supported by the target AP, current communication load of the target AP, maximum session duration (Max Session Duration) of the target AP, a maximum duty cycle (Max Duty Cycle) of the target AP, or a maximum FTM frequency Max FTM Frequency of the target AP.

The processor 502 is further configured to determine again, based on the service capability information of the target AP when the query condition changes, an AP with which FTM session negotiation needs to be performed.

The embodiments in this specification are all described in a progressive manner, for same or similar parts in the embodiments, refer to these embodiments, and each embodiment focuses on a difference from other embodiments. The apparatus disclosed in the embodiments is described relatively simply because it corresponds to the method disclosed in the embodiments, and for portions related to those of the method, refer to the description of the method.

The embodiments disclosed above are described to enable a person skilled in the art to implement or use this application. Various modifications made to the embodiments will be obvious to a person skilled in the art, and the general principles defined herein may also be implemented in other embodiments without departing from the spirit or scope of this application. Therefore, this application is not intended to be limited to these embodiments illustrated herein, but shall be construed in the widest scope consistent with the principles and novel features disclosed herein.

What is claimed is:

1. A method for selecting a wireless access point, comprising:

receiving a query request from a terminal, wherein the query request carries a query condition, wherein the query condition comprises an estimated position of the terminal and a scanning range set by the terminal;

determining a target access point (AP) from a plurality of APs supporting a fine time measurement (FTM) mechanism according to stored service capability information of each of the APs, the query condition, the estimated position of the terminal, and the scanning range set by the terminal, wherein the service capability information of each of the APs comprises position information of each of the APs, and wherein a position of the target AP is in a range determined according to the estimated position of the terminal and the scanning range set by the terminal; and sending a stored media access control (MAC) address of the target AP and stored information of a frequency band and a channel used by the target AP to the terminal to enable the terminal to perform FTM session negotiation with the target AP.

2. The method of claim 1, wherein the query condition comprises a value of an FTM parameter expected by the terminal during the FTM session negotiation, wherein the service capability information of each of the APs comprises a value of an FTM parameter supported by each of the APs, wherein determining the target AP comprises determining the target AP from the APs according to the value of the FTM parameter supported by each of the APs and the value of the FTM parameter expected by the terminal, and wherein an intersection set of a value of an FTM parameter supported by the target AP and the value of the FTM parameter expected by the terminal is a non-empty set.

3. The method of claim 2, wherein the FTM parameter supported by each of the APs or the FTM parameter expected by the terminal comprises at least one of an FTM format and bandwidth, a number of burst exponent, burst duration, FTMs per burst, minimum delta FTM, or a burst period.

4. The method of claim 1, wherein the query condition comprises a value of a number of burst exponent expected by the terminal and a value of a burst period expected by the terminal, wherein the service capability information of each of the APs comprises a value of a constraint parameter set by each of the APs, wherein the constraint parameter set by each of the APs comprises maximum session duration (Max Session Duration) constraining a value of a burst period and a value of a number of burst exponent supported by each of the APs, wherein Max Session Duration= T(Burst Period supported by the AP) $*2^{Number\ of\ Burst\ Exponent\ supported\ by\ the\ AP}$, wherein T(Burst Period supported by the AP) indicates a real time length corresponding to the value of the burst period supported by each of the APs, wherein determining the target AP comprises determining the target AP from the APs according to a value of Max Session Duration of each of the APs, the value of the number of burst exponent expected by the terminal, and the value of the burst period expected by the terminal, wherein the value of the number of burst exponent expected by the terminal, the value of the burst period expected by the terminal, and a value of Max Session Duration set by the target AP meet a first constraint condition, wherein the first constraint condition comprises T(Burst Duration expected by the terminal) $*2^{Number\ of\ Burst\ Exponent\ expected\ by\ the\ terminal}$<Max Session Duration, and wherein T(Burst Period expected by the terminal) indicates a real time length corresponding to the value of the burst period expected by the terminal.

5. The method of claim 1, wherein the query condition comprises a value of a burst duration expected by the terminal and a value of a burst period expected by the terminal, wherein the service capability information of each of the APs comprises a value of a constraint parameter set by each of the APs, wherein the constraint parameter set by each of the APs comprises a maximum duty cycle (Max Duty Cycle) constraining a value of a burst period and a value of burst duration supported by each of the APs, wherein Max Duty Cycle=T(Burst Duration supported by the AP)/T(Burst Period supported by the AP), wherein T(Burst Period supported by the AP) indicates a real time length corresponding to the value of the burst period supported by each of the APs, wherein T(Burst Duration supported by the AP) indicates a real time length corresponding to the value of the burst duration supported by each of the APs, wherein determining the target AP comprises determining the target AP from the APs according to a value of Max Duty Cycle of each of the APs, the value of the burst duration expected by the terminal, and the value of the burst period expected by the terminal, wherein the value of the burst duration expected by the terminal, the value of the burst period expected by the terminal, and a value of a Max Duty Cycle set by the target AP meet a second constraint condition, wherein the second constraint condition comprises T(Burst Duration expected by the terminal)/T(Burst Period expected by the terminal)<Max Duty Cycle, wherein T(Burst Duration expected by the terminal) indicates a real time length corresponding to the value of the burst duration expected by the terminal, and wherein T(Burst Period expected by the terminal) indicates a real time length corresponding to the value of the burst period expected by the terminal.

6. The method of claim 1, wherein the query condition comprises a value of FTMs per burst expected by the terminal and a value of a burst duration expected by the terminal, wherein the service capability information of each of the APs comprises a value of a constraint parameter set by each of the APs, wherein the constraint parameter set by each of the APs comprises a maximum FTM frequency (Max FTM Frequency) constraining a value of FTMs per burst and a value of a burst duration supported by each of the APs, wherein Max FTM Frequency=FTMs per Burst supported by the AP/T(Burst Duration supported by the AP), wherein T(Burst Duration supported by the AP) indicates a real time length corresponding to the value of the burst duration supported by each of the APs, wherein determining the target AP comprises determining the target AP from the APs according to a value of Max FTM Frequency of each of the APs, the value of the burst duration expected by the terminal, and the value of FTMs per burst expected by the terminal, wherein the value of FTMs per burst expected by the terminal, the value of the burst duration expected by the terminal, and a value of a Max FTM Frequency set by the target AP meet a third constraint condition, wherein the third constraint condition comprises FTMs per burst expected by the terminal/T(Burst Duration expected by the terminal) <Max FTM Frequency, and wherein T(Burst Duration expected by the terminal) indicates a real time length corresponding to the value of the burst duration expected by the terminal.

7. The method of claim 1, further comprising:
determining another target AP from the plurality of APs according to stored service capability information of each of the APs and the query condition;
sending a stored media access control (MAC) address of the another target AP and stored information of a frequency band and a channel used by the another target AP to the terminal;
prioritizing at least two target APs comprising the target AP and the other target AP according to a preset prioritization rule, to obtain a priority order of the at least two target APs, wherein the prioritization rule comprises at least one of a priority of an AP in the at least two target APs with a position that proximate to an estimated position of the terminal is higher, a priority of an AP in the at least two target APs with an FTM format and bandwidth that has a larger value is higher, a priority of an AP in the at least two target APs with a constraint parameter that has a larger value is higher, or a priority of an AP in the at least two target APs with a communication load that is lower, in response to the service capability information of each of the APs further comprising the communication load of each of the APs, is higher; and
sending the priority order of the at least two target APs to the terminal to enable the terminal to select, according to the priority order, an AP with which the FTM session negotiation needs to be performed.

8. The method of claim 1, further comprising sending service capability information of the target AP to the terminal to enable the terminal to determine again, based on the service capability information of the target AP and for a new query condition, an AP meeting the new query condition.

9. A fine time measurement (FTM) session method implemented by a terminal, comprising:
sending a query request to a server, wherein the query request carries a query condition, wherein the query condition comprises an estimated position of the terminal and a scanning range set by the terminal;
obtaining a Media Access Control (MAC) address of a target access point (AP) and information about a frequency band and a channel used by the target AP from the server, wherein the target AP is an AP supporting an FTM mechanism, and wherein the target AP meets the query condition, and wherein a position of the target AP is in a range determined according to the estimated position of the terminal and the scanning range set by the terminal;
scanning for, according to the MAC address of the target AP, the target AP in the frequency band and on the channel used by the target AP to obtain the target AP; and
performing FTM session negotiation with the target AP in response to the target AP being obtained.

10. The FTM session method of claim 9, wherein the query condition comprises a value of an FTM parameter expected by the terminal during the FTM session negotiation, and wherein an intersection set of a value of an FTM parameter supported by the target AP and the value of the FTM parameter expected by the terminal is a non-empty set.

11. The FTM session method of claim 9, further comprising:
obtaining a Media Access Control (MAC) address of another target access point (AP) and information about a frequency band and a channel used by the another target AP from the server, wherein the another target AP is an AP supporting an FTM mechanism, and wherein the another target AP meets the query condition; and
obtaining a priority order of the at least two target APs comprising the target AP and the other target AP,
wherein performing the FTM session negotiation with the target AP comprises selecting, from the at least two target APs according to the priority order, an AP with which the FTM session negotiation needs to be performed to perform the FTM session negotiation.

12. The FTM session method of claim 9, further comprising:
obtaining service capability information of the target AP from the server, wherein the service capability information of the target AP comprises at least one of position information of the target AP, a value of an FTM parameter supported by the target AP, current communication load of the target AP, a maximum session duration of the target AP, a Max Duty Cycle of the target AP, or a maximum FTM frequency of the target AP; and
determining again, based on the service capability information of the target AP and for a new query condition, an AP with which the FTM session negotiation needs to be performed.

13. A server, comprising:
a communications interface configured to receive a query request from a terminal, wherein the query request carries a query condition, wherein the query condition comprises an estimated position of the terminal and a scanning range set by the terminal;
a memory coupled to the communications interface and configured to store service capability information of each of a plurality of access points (APs) supporting a fine time measurement (FTM) mechanism, media access control (MAC) addresses of the APs, and information about frequency bands and channels used by the APs, wherein the service capability information of each of the APs comprises position information of each of the APs; and
a processor coupled to the communications interface and the memory and configured to determine a target AP from the APs according to the stored service capability information of each of the APs, the query condition, the estimated position of the terminal and the scanning range set by the terminal, wherein a position of the target AP is in a range determined according to the estimated position of the terminal and the scanning range set by the terminal,
wherein the communications interface is further configured to send a stored MAC address of the target AP and stored information of a frequency band and a channel used by the target AP to the terminal to enable the terminal to perform FTM session negotiation with the target AP.

14. The server of claim 13, wherein the query condition carried in the query request comprises a value of an FTM parameter expected by the terminal during the FTM session negotiation, wherein the service capability information of each of the APs stored in the memory comprises a value of an FTM parameter supported by each of the APs, wherein the processor is further configured to determine the target AP from the APs according to the value of the FTM parameter supported by each of the APs and the value of the FTM parameter expected by the terminal, and wherein an intersection set of a value of an FTM parameter supported by the target AP and the value of the FTM parameter expected by the terminal is a non-empty set.

15. The server of claim 14, wherein the FTM parameter supported by each of the APs stored in the memory or the FTM parameter expected by the terminal comprises at least one of an FTM format and bandwidth, a number of burst exponent, burst duration, FTMs per burst, minimum delta FTM, or a burst period.

16. The server of claim 13, wherein the query condition carried in the query request comprises a value of a number of burst exponent expected by the terminal and a value of a burst period expected by the terminal, wherein the service capability information of each of the APs stored in the memory comprises a value of a constraint parameter set by each of the APs, wherein the constraint parameter set by each of the APs comprises maximum session duration (Max Session Duration) constraining a value of a burst period and a value of a number of burst exponent supported by each of the APs, wherein Max Session Duration= T(Burst Period supported by the AP) $*2^{Number\ of\ Burst\ Exponent\ supported\ by\ the\ AP}$, wherein T(Burst Period supported by the AP) indicates a real time length corresponding to the value of the burst period supported by each of the APs, wherein the processor is further configured to determine the target AP from the APs according to a value of Max Session Duration of each of the APs, the value of the number of burst exponent expected by the terminal, and the value of the burst period expected by the terminal, wherein the value of the number of burst exponent expected by the terminal, the value of the burst period expected by the terminal, and a value of Max Session Duration set by the target AP meet a first constraint condition, wherein the first constraint condition comprises T(Burst Period expected by the terminal) $*2^{Number\ of\ Burst\ Exponent\ expected\ by\ the\ terminal}$<Max Session Duration, and wherein T(Burst Period expected by the terminal) indicates a real time length corresponding to the value of the burst period expected by the terminal.

17. The server of claim 13, wherein the query condition carried in the query request comprises a value of a burst duration expected by the terminal and a value of a burst period expected by the terminal, wherein the service capability information of each of the APs stored in the memory comprises a value of a constraint parameter set by each of the APs, wherein the constraint parameter set by each of the APs comprises a maximum duty cycle (Max Duty Cycle) constraining a value of a burst period and a value of a burst duration supported by each of the APs, wherein Max Duty Cycle=T(Burst Duration supported by the AP)/T(Burst Period supported by the AP), wherein T(Burst Period supported by the AP) indicates a real time length corresponding to the value of the burst period supported by each of the APs, wherein T(Burst Duration supported by the AP) indicates a real time length corresponding to the value of the burst duration supported by each of the APs, wherein the processor is further configured to determine the target AP from the APs according to a value of Max Duty Cycle of each of the APs, the value of the burst duration expected by the terminal, and the value of the burst period expected by the terminal, wherein the value of the burst duration expected by the terminal, the value of the burst period expected by the terminal, and a value of a Max Duty Cycle set by the target AP meet a second constraint condition, wherein the second constraint condition comprises T(Burst Duration expected by the terminal)/T(Burst Period expected by the terminal) <Max Duty Cycle, wherein T(Burst Duration expected by the terminal) indicates a real time length corresponding to the value of the burst duration expected by the terminal, and wherein T(Burst Period expected by the terminal) indicates a real time length corresponding to the value of the burst period expected by the terminal.

18. The server of claim 13, wherein the query condition carried in the query request comprises a value of FTMs per burst expected by the terminal and a value of a burst duration expected by the terminal, wherein the service capability information of each of the APs stored in the memory comprises a value of a constraint parameter set by each of the APs, wherein the constraint parameter set by each of the APs comprises a maximum FTM frequency (Max FTM Frequency) constraining a value of FTMs per burst and a value of a burst duration supported by each of the APs, wherein Max FTM Frequency=FTMs per Burst supported by the AP/T(Burst Duration supported by the AP), wherein T(Burst Duration supported by the AP) indicates a real time length corresponding to the value of the burst duration supported by each of the APs, wherein the processor is further configured to determine the target AP from the APs according to a value of Max FTM Frequency of each of the APs, the value of the burst duration expected by the terminal, and the value of FTMs per burst expected by the terminal, wherein the value of FTMs per burst expected by the terminal, the value of the burst duration expected by the terminal, and a value of a Max FTM Frequency set by the target AP meet a third constraint condition, wherein the third constraint condition comprises FTMs per burst expected by the terminal/T(Burst Duration expected by the terminal) <Max FTM Frequency, and wherein T(Burst Duration expected by the terminal) indicates a real time length corresponding to the value of the burst duration expected by the terminal.

19. The server of claim 13, wherein the processor is further configured to:
- determine another target AP from the plurality of APs according to stored service capability information of each of the APs and the query condition;
- send a stored media access control (MAC) address of the another target AP and stored information of a frequency band and a channel used by the another target AP to the terminal; and
- prioritize at least two target APs comprising the target AP and the other target AP, according to a preset prioritization rule to obtain a priority order of the at least two target APs, wherein the prioritization rule comprises at least one of a priority of an AP in the at least two target APs with a position that is proximate to an estimated position of the terminal is higher, a priority of an AP in the at least two target APs with a FTM format and bandwidth that has a larger value is higher, a priority of an AP in the at least two target APs with a constraint parameter that has a larger value is higher, or a priority of an AP in the at least two target APs with a current communication load that is lower, in response to the service capability information of each of the APs further comprising the communication load of each of the APs, is higher, and wherein the communications interface is further configured to send the priority order of the at least two target APs to the terminal to enable the terminal to select, according to the priority order, an AP with which the FTM session negotiation needs to be performed.

20. The server of claim 13, wherein the communications interface is further configured to send service capability information of the target AP to the terminal to enable the terminal to determine again, based on the service capability information of the target AP and for a new query condition, an AP meeting the new query condition.

21. A terminal, comprising:
a communications interface configured to:
send a query request to a server, wherein the query request carries a query condition, and wherein the query condition comprises an estimated position of the terminal and a scanning range set by the terminal; and
obtain a Media Access Control (MAC) address of a target access point (AP) and information about a frequency band and a channel used by the target AP from the server, wherein the target AP is an AP supporting a fine time measurement (FTM) mechanism, and wherein the target AP meets the query condition; and
a processor coupled to the communications interface and configured to:
scan for, according to the MAC address of the target AP, the target AP in the frequency band and on the channel used by the target AP;
obtain the target AP, wherein a position of the target AP is in a range determined according to the estimated position of the terminal and the scanning range set by the terminal; and
perform FTM session negotiation with the target AP in response to the target AP being obtained.

22. The terminal of claim 21, wherein the query condition carried in the query request comprises a value of an FTM parameter expected by the terminal during the FTM session negotiation, and wherein an intersection set of a value of an FTM parameter supported by the target AP and the value of the FTM parameter expected by the terminal is a non-empty set.

23. The terminal of claim 21, wherein the processor is further configured to:
obtain a Media Access Control (MAC) address of another target access point (AP) and information about a frequency band and a channel used by the another target AP from the server, wherein the another target AP is an AP supporting an FTM mechanism, and wherein the another target AP meets the query condition;
obtain a priority order of at least two target APs comprising the target AP and the other target AP; and
select, from the at least two target APs according to the priority order, an AP with which the FTM session negotiation needs to be performed to perform the FTM session negotiation.

24. The terminal of claim 21, wherein the communications interface is further configured to obtain service capability information of the target AP received from the server, wherein the service capability information of the target AP comprises at least one of position information of the target AP, a value of an FTM parameter supported by the target AP, current communication load of the target AP, a maximum session duration of the target AP, a Max Duty Cycle of the target AP, or a maximum FTM frequency of the target AP, and wherein the processor is further configured to determine again, based on the service capability information of the target AP and for a new query condition, an AP with which the FTM session negotiation needs to be performed.

25. The method of claim 1, wherein the query condition comprises a value of a number of burst exponent expected by the terminal and a value of a burst period expected by the terminal.

26. The FTM session method of claim 9, wherein the query condition comprises a value of an FTM parameter expected by the terminal during the FTM session negotiation.

27. The server of claim 13, wherein the query condition carried in the query request comprises a value of a number of burst exponent expected by the terminal and a value of a burst period expected by the terminal.

28. The terminal of claim 21, wherein the query condition carried in the query request comprises a value of an FTM parameter expected by the terminal during the FTM session negotiation.

* * * * *